Oct. 30, 1923.
H. E. PATRICK ET AL
MECHANIC'S WORKSTAND
Filed July 23, 1918
1,472,425
6 Sheets-Sheet 1
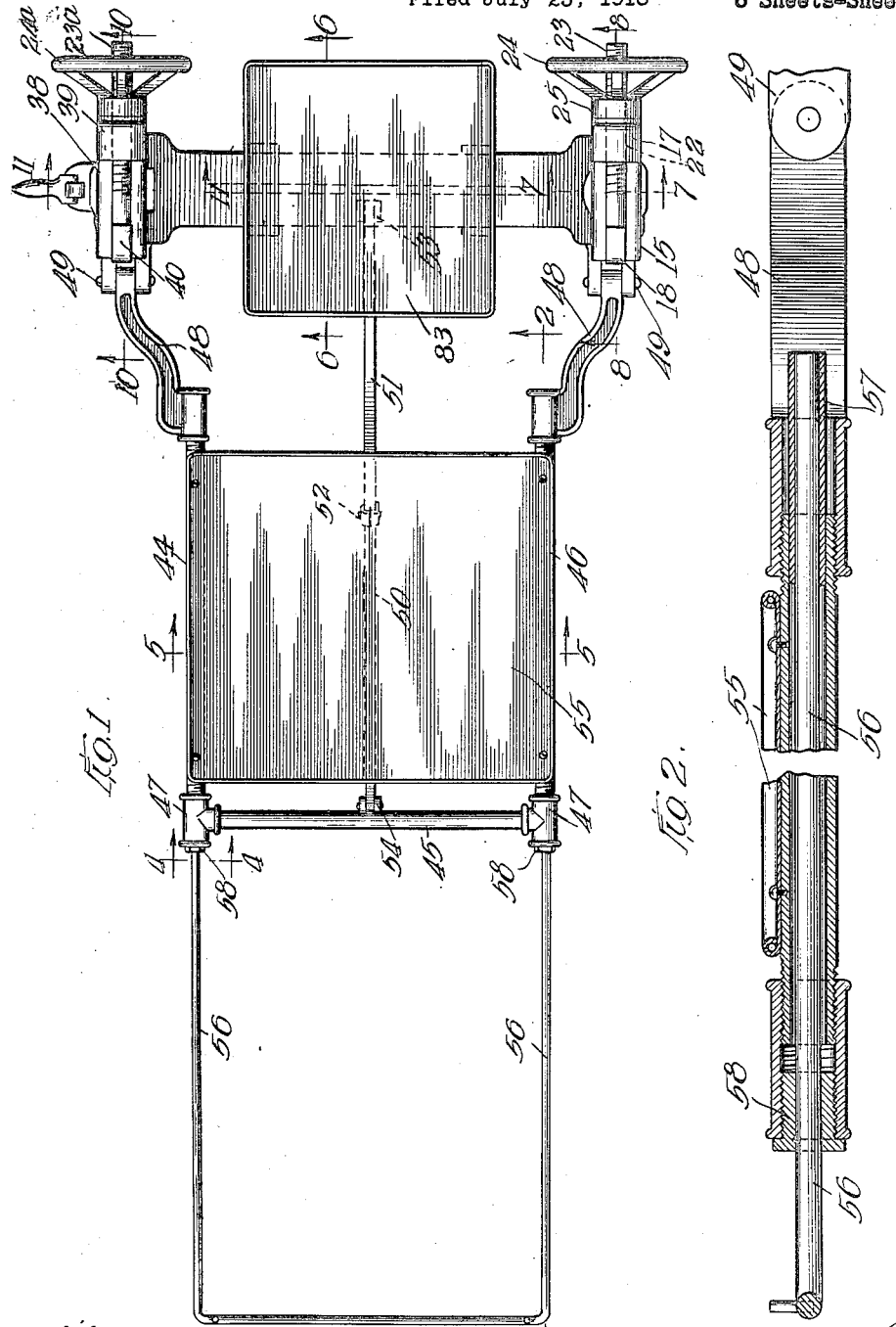

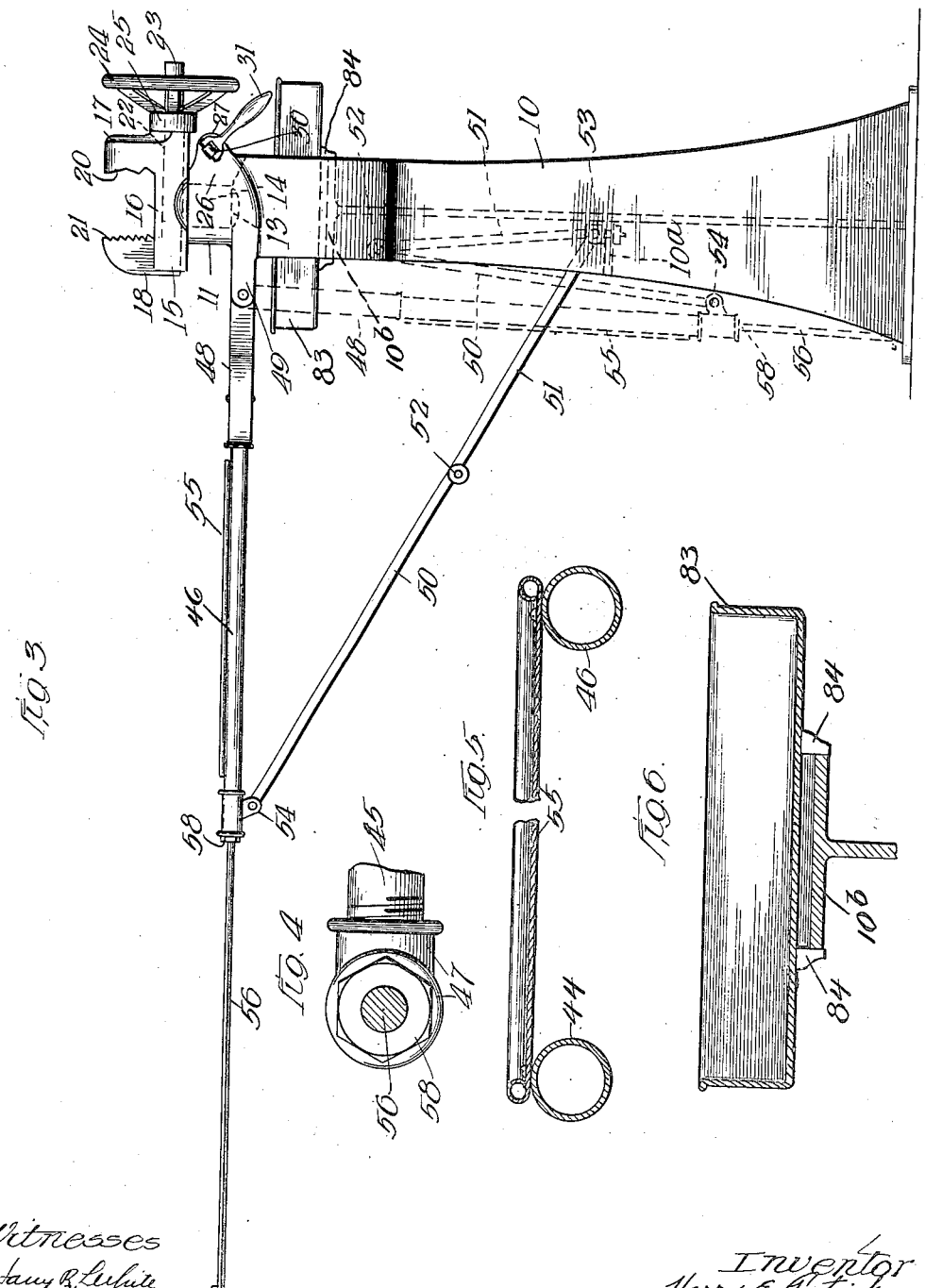

Oct. 30, 1923.
H. E. PATRICK ET AL
MECHANIC'S WORKSTAND
Filed July 23, 1918   6 Sheets-Sheet 3
1,472,425
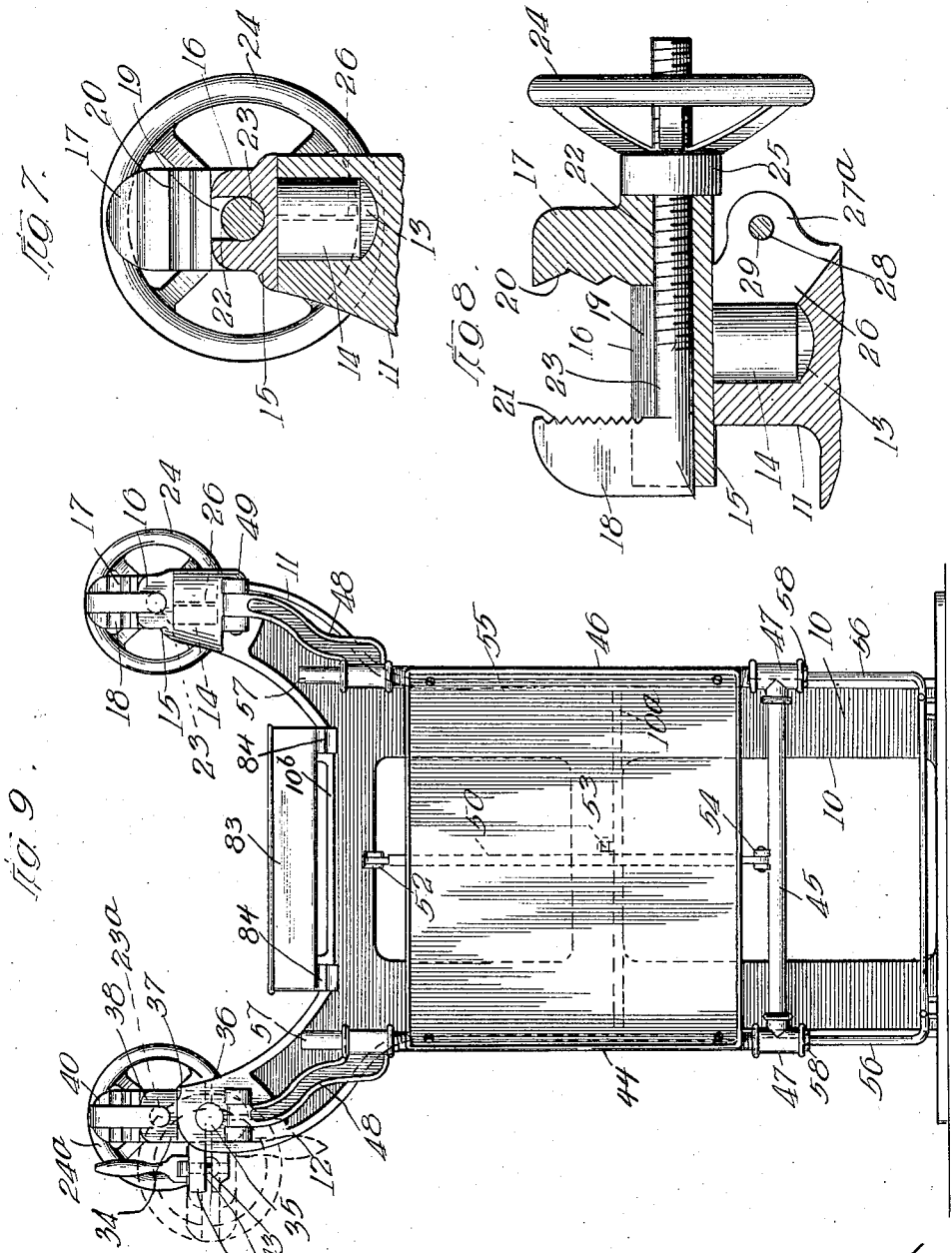

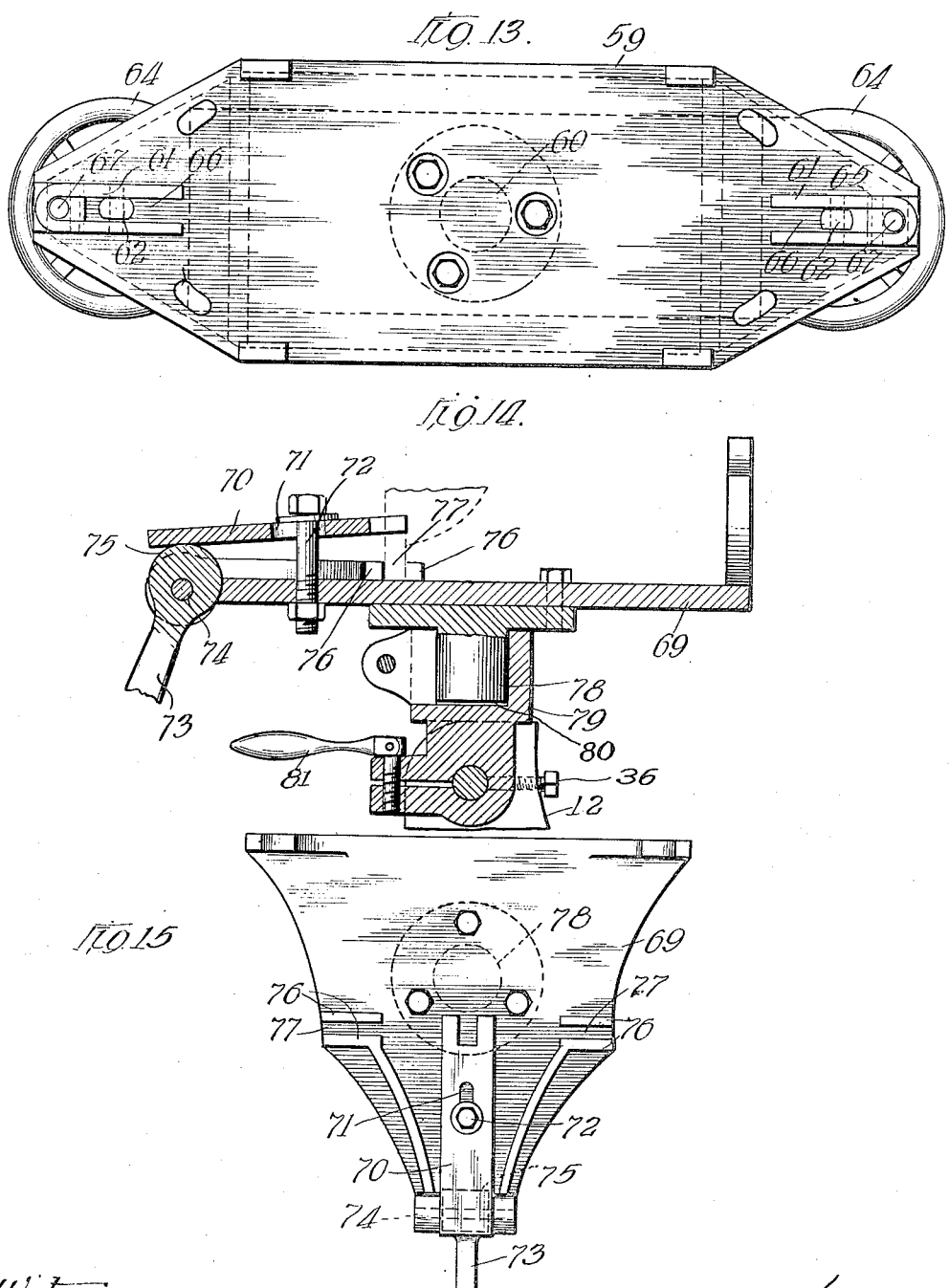

Oct. 30, 1923.  1,472,425
H. E. PATRICK ET AL
MECHANIC'S WORKSTAND
Filed July 23, 1918   6 Sheets-Sheet 6
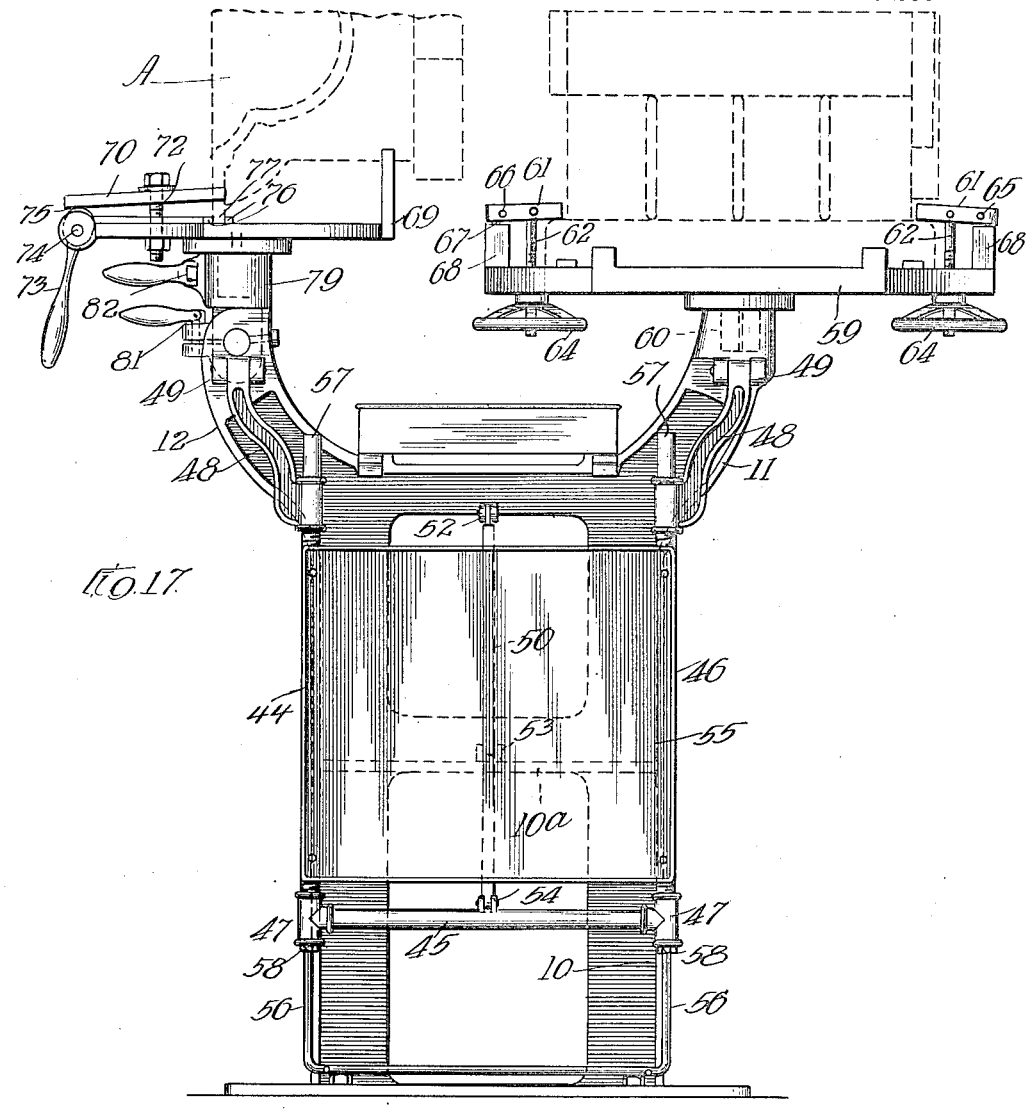
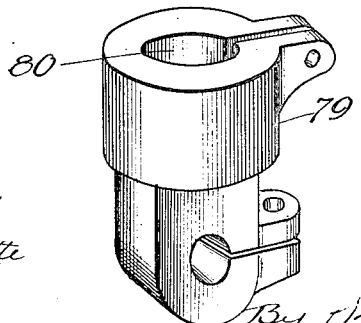

Patented Oct. 30, 1923.

1,472,425

UNITED STATES PATENT OFFICE.

HARRY E. PATRICK AND ANDREW J. PETERSON, OF EVANSTON, AND JOHN W. BERMES, OF CHICAGO, ILLINOIS, ASSIGNORS TO SERVICE STATION EQUIPMENT COMPANY, OF CHICAGO, ILLINOIS, A CORPORATION OF ILLINOIS.

MECHANIC'S WORKSTAND.

Application filed July 23, 1918. Serial No. 246,365.

*To all whom it may concern:*

Be it known that we, HARRY E. PATRICK, ANDREW J. PETERSON, and JOHN W. BERMES, citizens of the United States, residing at Evanston, Chicago, and Chicago, respectively, in the county of Cook and State of Illinois, have invented certain new and useful Improvements in Mechanics' Workstands, of which the following is a specification.

Our invention relates to a mechanic's work-stand, and has for its primary object to provide a work-stand having clamping devices in which machinery parts of various forms may be rigidly clamped in such positions as will be most convenient for a mechanic to repair, assemble or disassemble such parts, and which will permit the object supported in said clamping devices to be readily moved from one position to another without releasing the clamping action of said devices.

Another object of the invention is to provide a work-stand of the above character, in which extensible means are provided for supporting relatively long objects, such means being adapted to be contracted when not in use, so that the work-stand will require a relatively small floor space.

Another object of the invention is to provide suitable clamping attachments for a work-stand of the above character whereby one or more objects, such for example, as an automobile engine or any of the various parts of an automobile or other machine, may be quickly and firmly clamped in any desired position on said stand. In this connection the invention contemplates various forms of interchangeable attachments which may be secured to said stand at different points, and which may, if desired, be moved bodily with an object clamped thereto from one of said points to another.

The invention consists in the novel arrangements, constructions and combination of parts, hereinafter described and claimed, for carrying out the above stated objects, and such other incidental objects as will appear from the following specification. The preferred embodiment of our invention is illustrated in the accompanying drawings, wherein like characters of reference designate like parts, and wherein:

Fig. 1 is a plan view of a mechanic's work-stand constructed in accordance with the principles of our invention, showing an extensible supporting device, forming a part of the invention, in its extended position.

Fig. 2 is a sectional view, taken on line 2—2 of Fig. 1, showing the extensible shelf in its contracted position;

Fig. 3 is a side view in elevation of the structure shown in Fig. 1;

Fig. 4 is a fragmentary sectional view, taken on line 4—4 of Fig. 1, looking in the direction indicated by the arrows;

Figure 10:
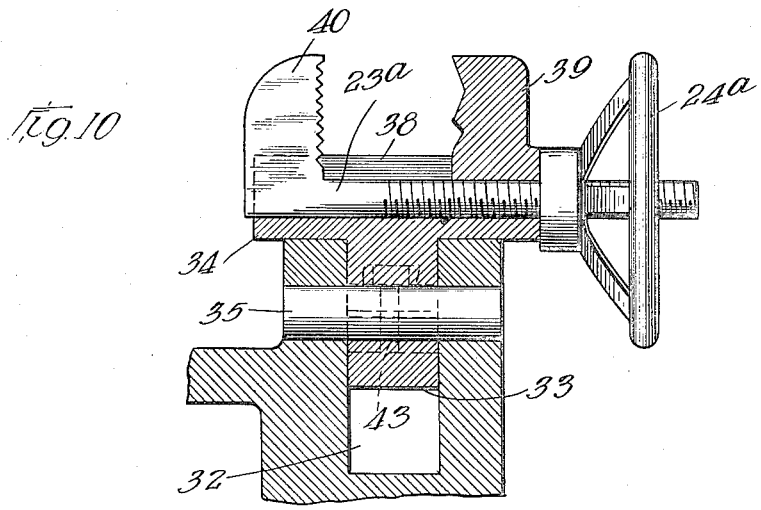
Figure 11:
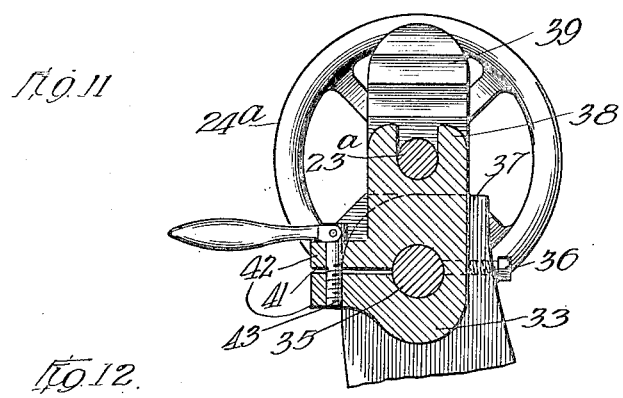
Figure 12:
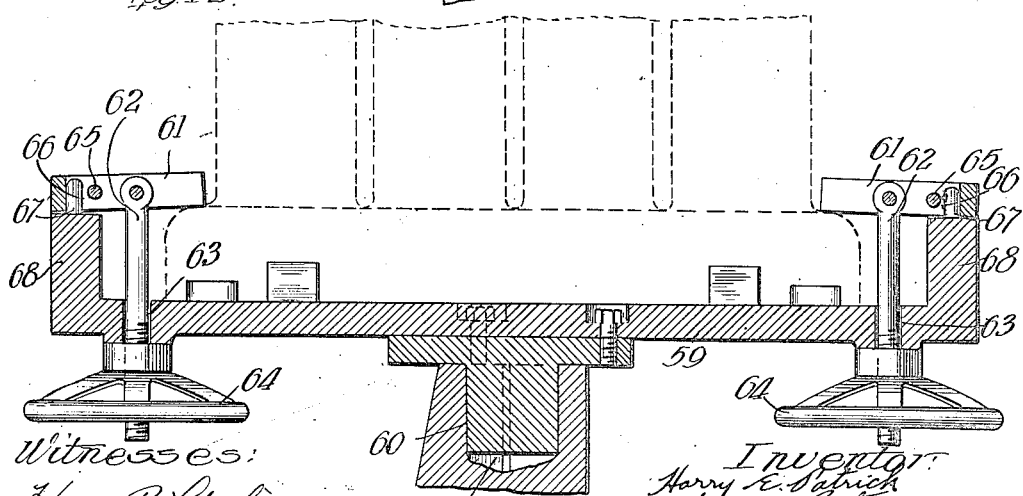

Figs. 5 and 6 are sectional views taken on lines 5—5 and 6—6, respectively, of Fig. 1;

Fig. 7 is a cross-sectional view taken on line 7—7 of Fig. 1, illustrating the preferred construction of a vise forming a part of our invention;

Fig. 8 is a longitudinal vertical section through the vise illustrated in Fig. 7, this figure being taken on line 8—8 of Fig. 1;

Fig. 9 is a rear view in elevation of the structure shown in Fig. 3, showing the extensible supporting shelf folded to its lowered position;

Fig. 10 is a vertical longitudinal section taken on line 10—10 of Fig. 1, illustrating the construction of another form of vise forming a part of our invention;

Fig. 11 is a cross-section through the vise, illustrated in Fig. 10, the section being taken on line 11—11 of Fig. 1;

Fig. 12 is a longitudinal sectional view of one form of clamping attachment used in connection with our preferred embodiment, and illustrating a part of an automobile engine clamped in vertical position thereon;

Fig. 13 is a plan view in elevation of the attachment shown in Fig. 12;

Fig. 14 is a longitudinal sectional view of another form of clamping attachment, showing a portion of an automobile engine clamped in horizontal position thereon;

Fig. 15 is a plan view of the clamping attachment shown in Fig. 14;

Fig. 16 is a hinged attachment employed in our preferred construction to provide a hinged connection between the clamping attachments shown in Figs. 12 to 15, inclusive, with the base of the work-stand; and Fig. 17 is a rear view, similar to Fig. 9, showing the attachments shown in Figs.

12 and 16, inclusive, in operative position, and illustrating the different manner in which an automobile engine may be clamped on said attachments.

Referring first to Figs. 1 to 11, inclusive, of the drawings, 10 designates a base formed with upwardly extending arms 11 and 12. The arm 11 is formed at the upper end with a socket 13 adapted to receive a stud 14 formed on the under side of a vice designated generally at 15. This vice has a swivel connection with the arm 11 which permits it to be rotated on a vertical axis, and comprises a head 16 formed with a rigid upwardly projecting jaw member 17 and a movable jaw member 18 slidably fitted in a slot 19, extending longitudinally of the head 16. The inner faces of the jaw members 17, 18, are provided with transverse grooves providing teeth, as indicated at 20, 21. The slot 19 terminates at one end with a bore 22 through which extends a shank 23 formed at the lower end of the movable jaw member 18. The outer end of this shank is threaded, and carries a hand wheel 24, the hub of which is formed with internal threads corresponding to the threads on the shank. A rotational movement of the hand wheel 24 in a clockwise direction moves the jaw member 18 toward the rigid jaw member 17. The jaw member 18 is preferably freely movable independently of the operation of the hand wheel 24; that is, it may be moved into contact with the object being clamped in the vice and the hand wheel 24 subsequently rotated on the shank 23, so as to cause the object in the vice to be tightly clamped between the jaw members 17, 18.

26 designates a slit extending from the wall of the socket 13 to the outside of the arm 11, and 27, 27ª, designate ears disposed on opposite sides of the said slit. These ears are apertured as indicated at 28, the aperture in the ear 27ª being threaded to receive a bolt 29 adapted when tightened to produce a gripping action on the stud 14, so as to clamp the vice 15 in any desired position. The head 30 of the bolt 29 is provided with a pivoted handle 31 which enables the workman to tighten or loosen the bolt 29 as desired.

The arm 12 of the base is bifurcated, as indicated at 32, and receives a shank 33 of a vice, designated generally at 34. This vice is preferably supported on a shaft 35 which extends through the bifurcated portion of the arm 12 and the shank 33 of the vice. The shaft 35 is preferably held against rotation by means of set screws 36, and provides a horizontal pivotal axis for the vice 34. The upper end of the arm 12 is flattened as indicated at 37, so as to provide a firm support for the vice 34 when it is in its upright position, as indicated in full lines in Figs. 9, 10 and 11. The head 38 of this vice is formed with a rigid jaw member 39 and is provided with a slidable jaw member 40 which is mounted in a slot formed in the head 38, and is operated in substantially the same manner as that described in connection with the vice 15, the shank of the movable jaw 40 and the hand wheel being designated in this case 23ª, 24ª, respectively. It will be obvious from the above description that an object may be clamped in a horizontal position in the vice 34, and the entire vice moved on its pivot 35 to various angular positions, such for example, as that indicated in dotted lines in Fig. 9. In order to firmly hold the vice 34 in any desired position, the shank 33 is slitted as indicated at 41, and formed on opposite sides of the slit with ears 42 which receive a screw bolt 43, which, when tightened, will tend to bring the ears 42 together and provide a tight gripping action on the stub shaft 35.

In our preferred construction we preferably provide the stand with a hinged leaf which may be raised to provide a suitable shelf for holding the mechanic's tools, and also provide a suitable support for small objects on which the mecahnic may be working. This hinged leaf preferably consists of pipes 44, 45, 46, secured together at one end by T-shaped pipe connections 47, 47. The inner end of the pipes 44, 46, are secured in castings designated 48, which are pivoted, as indicated at 49, to the arms 11, 12, of the base 10. When the hinged leaf is raised to its full line position shown in Fig. 3, it is supported by a folding brace consisting of rods 50, 51, hinged together as indicated at 52. The inner end of the rod 51 is hingedly connected to the base 10 of the stand by means of a bifurcated screw bolt 53 extending through an aperture in a cross-web 10ª, and the outer end of the rod 50 is hinged between ears 54 formed on the cross pipe 45. 55 designates a shallow tray which is secured to the pipes 44, 46, and provides a convenient receptacle for holding the mechanic's tools or small machine parts.

In order to provide a suitable support for the free end of long objects which may be clamped in either or both of said vices, such, for example, as the propeller shaft of an automobile, we have provided the hinged leaf 55 with an extensible member consisting preferably of a substantially U-shaped rod 56, the ends of which are slidably fitted in the pipes 44, 46, of the hinged leaf, above described. With this arrangement the rod 56 may be extended, as indicated in full lines in Fig. 3, to provide the necessary support for the outer end of a long object upon which the mechanic may be working. If the object being repaired does not require such support, the rod 56 may be telescoped within the pipes 44, 46. The ends of the rod 56 carry sleeves 57, 57, preferably of brass or other non-corrosive material, which fit within the pipes 44, 46, so as to provide a suitable bearing which engages the inner surfaces of the said pipes. The outward movement of the rod 56 is limited by means of the sleeves 57, 57 coming into contact with the inner face of screw plugs 58, 58. When the extensible supporting frame 56 and the hinged leaf 44 are not in use, the frame 56 may be telescoped within the pipes 44, 46, as indicated in Fig. 2, and the hinged leaf folded down to the position shown in dotted lines in Fig. 3, so as not to consume unnecessary floor space.

When repairing or assembling large objects which cannot be properly clamped in the vices 15, 34, we preferably provide clamping attachments having studs which fit into the socket 13. In Figs. 12 to 15, inclusive, we have shown two forms of clamping devices suitable for supporting the cylinder block of an automobile engine in a vertical or horizontal position. When it is desired to support such objects in an upright position, as shown at the right-hand side of Fig. 17, a clamping attachment, designated generally at 59, is used. This clamping attachment consists of a base, provided with a suitable stud 60 adapted to fit into the socket 13 of the arm 11 in substantially the same manner as that described in connection with the vice 15. The engine cylinder block is preferably clamped to said attachment by means of U-shaped clamping bars 61, 61, pivotally secured to the upper end of screw rods 62, 62. These rods extend through apertures 63 in the base 59 of the clamping attachment, and have threaded engagement with hand wheels 64, 64. 65 designates pins extending across the space between the legs of the U-shaped clamping bars 61, 61, so as to provide, in effect, eyelets 66 which fit over studs 67 on the upwardly extending flanges 68 of the base, so as to provide a detachable connection between the clamping bars 61 and said base.

Another form of clamping attachment is indicated at 69. This attachment is adapted to support an engine cylinder block in a horizontal position. In connection with this form of clamping attachment, we preferably provide a clamping bar 70 which is formed with a slot, as indicated at 71, through which extends a bolt 72. 73 designates a lever which is pivoted to the base 59 of this attachment, as indicated at 74, and formed with a cam surface 75 which bears against the under surface of the clamping bar 70. This clamping attachment is also provided with bosses 76, 76, which provide channels to receive the usual flange 77 at the base of the engine cylinder block. By moving the lever 73 downward, the outer end of the clamping bar 70 is raised so as to bring the inner end of said bar into a tight clamping engagement with the engine block. This clamping attachment is provided with a stud 78 which may be fitted into the socket 13 if it be desired to merely rotate the engine on a vertical axis. However, if it be desired to change the angular position of the engine, in addition to rotating it on a vertical axis, it is clamped into a socket fitting, indicated at 79 in Figs. 14, 16 and 17, which is adapted to be hingedly secured in the bifurcated portion of the arm 12 of the base of the stand. This socket fitting is formed with a socket 80 of substantially the same diameter of the socket 13, so as to receive the receiving studs of the vices or the clamping attachments, as desired.

It will be obvious that when the clamping attachments 59, 69, are used in connection with the socket fitting 79, the angular position of the object clamped thereto may be changed to suit the convenience of the mechanic. For example, if it be desired to change the position of the engine block designated at A, from the horizontal position to a vertical position, it would be necessary merely to loosen the clamping screw 81 and permit the socket attachment 79 to move from the vertical position to the horizontal position; that is, in the position in which the vice 34 is illustrated in dotted lines in Fig. 9. When either of the clamping attachments 59, 69, are in this position, the screw bolt 82 may be released so as to permit the clamping attachment and the object clamped thereon to be revolved on a horizontal axis to any position desired.

83 designates a basin for receiving oil or grease from the machine parts being disassembled. This basin is preferably formed on its bottom with spaced lugs 84 which fit over the web 10$^b$ between the arms 11 and 12 of the base.

While we have described our invention in its preferred embodiment, it will be obvious that modifications might be made without departing from the spirit of our invention.

We therefore do not wish to limit ourselves to the exact structure shown and described, except in so far as specific limitations may appear in the appended claims.

We claim:

1. A work stand comprising a base with an upstanding arm having a split socket pivotally mounted upon it, a holder having a swivel shank to fit said socket, manipulative means for tightening the socket around the shank, and manipulative means for fixing the socket at different angular positions on its pivotal mounting.

2. A work-stand comprising a base with an upstanding arm having a split socket pivotally mounted upon it, and split at the pivot, a holder having a swivel shank to fit said split socket, manipulative means for tightening the socket around the shank, and manipulative means for tightening the socket on its pivotal mounting.

3. A work stand comprising a base with widely spaced upstanding arms having openings, holders having shanks receivable in said openings and movable in various planes and angularly with pieces of work upon them as permitted by the wide spacing apart of the arms, and manipulative means for fixing the holders at various positions.

4. A work stand comprising a base with widely spaced upstanding arms having openings, holders having shanks receivable in said openings and variously movable with pieces of work upon them as permitted by the wide spacing apart of the arms, manipulative means for fixing the holders at various positions, and a basin supported by the stand between its arms.

5. A work stand comprising a base equipped at its upper part to carry work holders, holders mountable thereon, and a folding support mounted upon said base and adapted to assume and maintain a horizontal position to supply an extended rest for an elongated part of a piece of work held by the holders.

6. A work stand comprising a base equipped at its upper part to carry work holders, holders mountable thereon, a folding support mounted upon said base and adapted to assume and maintain a horizontal position, and a tray carried by said support.

7. A work stand comprising a base and column with widely spaced upstanding arms surmounted by holders; and a support extended laterally from the upper part of the column and supplying a rest at its extremity for an elongated longitudinal member of a piece of work whose transverse member is engaged with the first-mentioned holders.

8. A work stand comprising a base and column with widely spaced upstanding arms surmounted by holders; a support extended laterally from the upper part of the column and supplying a rest at its extremity for an elongated longitudinal member of a piece of work whose transverse member is engaged with the first-mentioned holders; and a basin or tray between the arms of the column.

JOHN W. BERMES.
HARRY E. PATRICK.
ANDREW J. PETERSON.